Nov. 8, 1955

G. W. CORNELIUS 2,722,927

APPARATUS FOR CONTROLLING INTERNAL
COMBUSTION ENGINE FUEL MIXTURES

Filed Oct. 29, 1952

Inventor:
George W. Cornelius.
By Fulwider, Mattingly & Babcock.
Att'ys.

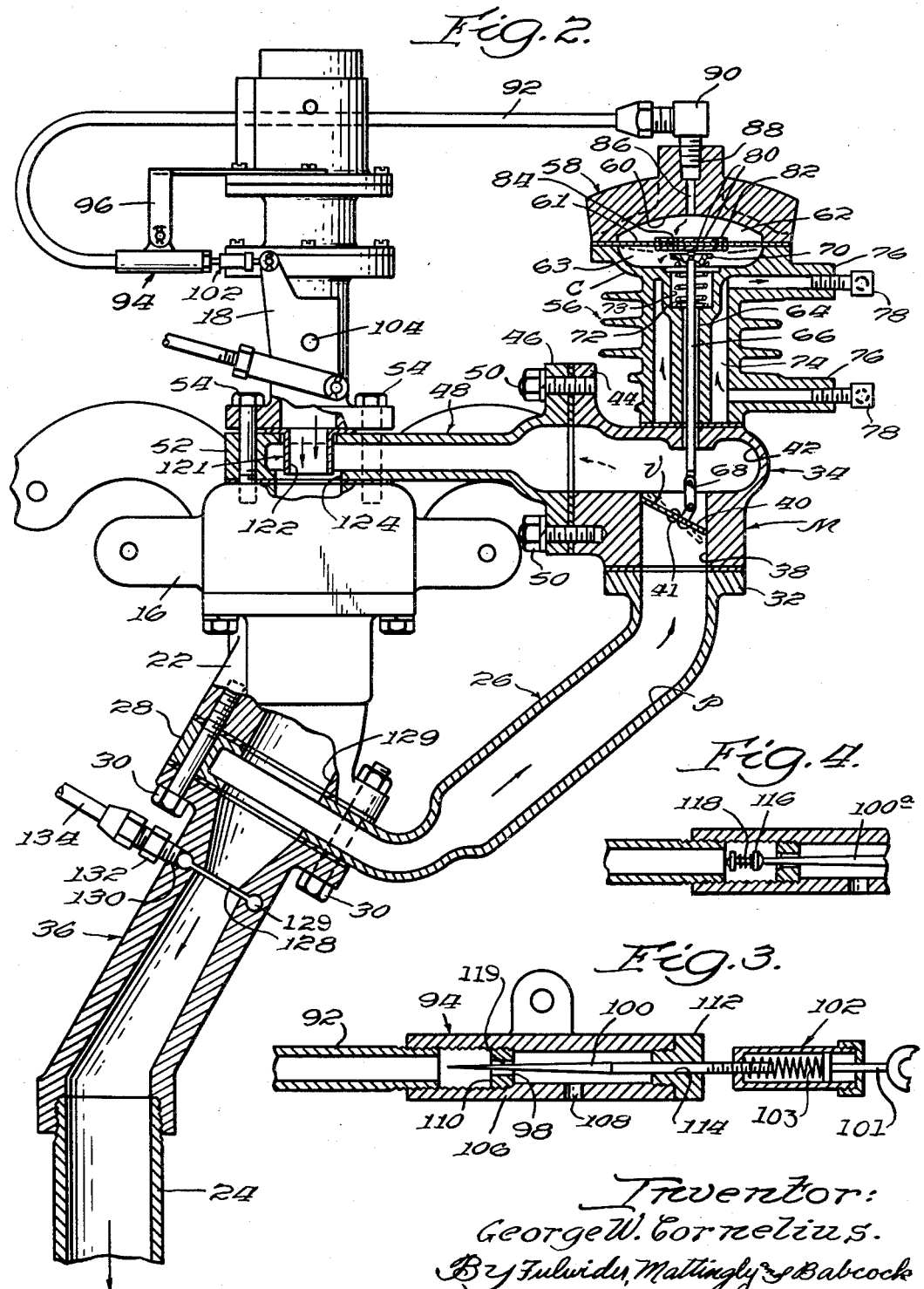

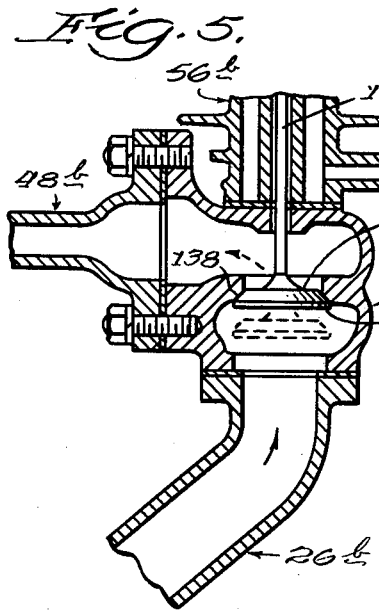
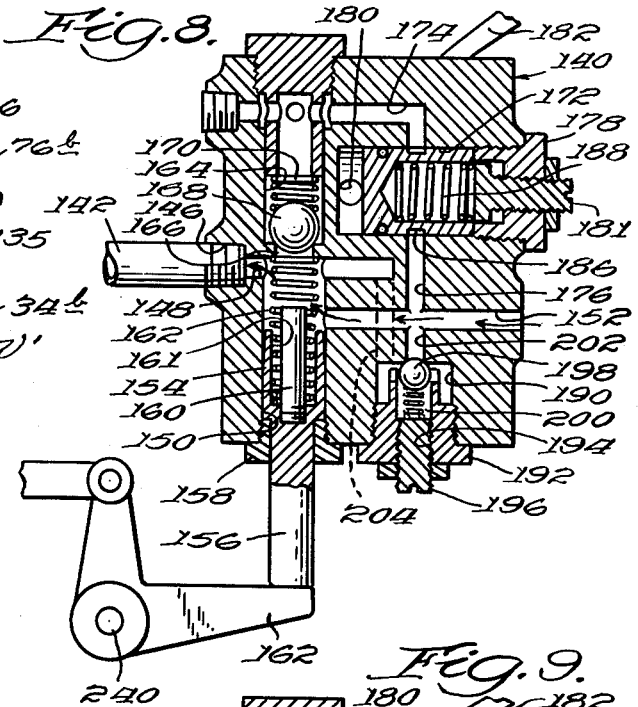
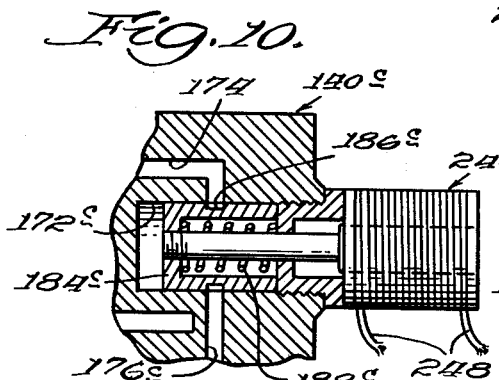
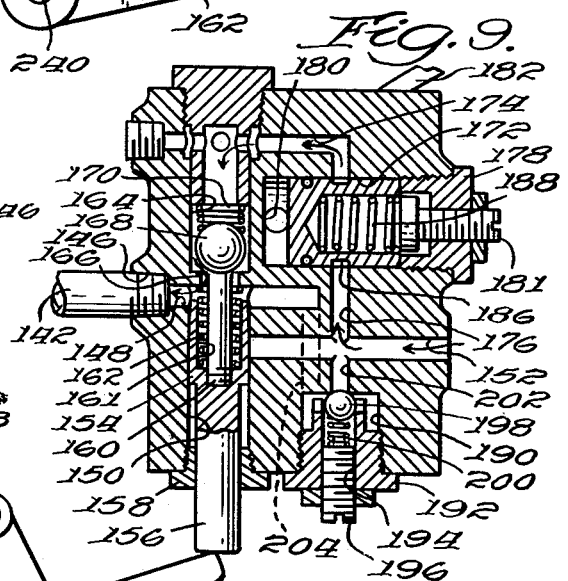
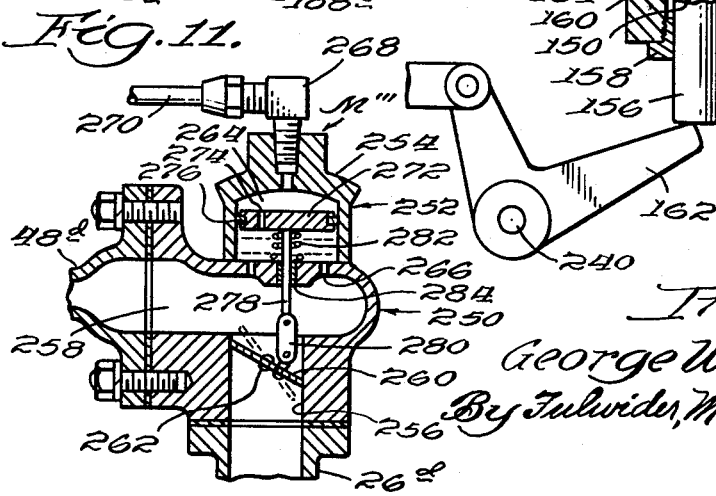

Inventor:
George W. Cornelius.
By Fulwider, Mattingly & Babcock.
Att'ys.

United States Patent Office 2,722,927
Patented Nov. 8, 1955

2,722,927

APPARATUS FOR CONTROLLING INTERNAL COMBUSTION ENGINE FUEL MIXTURES

George W. Cornelius, Pomona, Calif.

Application October 29, 1952, Serial No. 317,497

34 Claims. (Cl. 123—119)

The present invention relates generally to internal combustion engines, and more particularly to a novel method and apparatus for conditioning the gaseous fuel mixture entering the combustion chambers of such engines so as to improve the functioning thereof.

In the conventional internal combustion engine, the air fuel mixture is passed through a carburetor at a high velocity and is suddenly expanded within the intake manifold of the engine whereby there occurs a sharp reduction in the pressure and temperature of such mixture. This reduction in pressure and temperature tends to permit the unsaturated components of the fuel to be precipitated out of the mixture within the confines of the engine's intake manifold, especially where leaded fuels are used. This precipitation results in the build-up of foreign deposits within the intake manifold and the intake valve passages. These foreign deposits chiefly comprise gummy substances which have been introduced into the fuel in order to aid the stability thereof. The build-up of the foreign deposits causes the volumetric efficiency to drop appreciably because the lower intake manifold vacuum readings result in the carburetor enriching the air fuel ratio. Although the volumetric efficiency may be temporarily aided under these conditions by increasing the throttle opening of the carburetor, the only certain remedy is to dismantle, clean and reassemble the engine. Thus, the engine must be overhauled at relatively frequent intervals; this being particularly true in the case of stationary engines required to operate under constant load and speed conditions.

Another factor contributing to frequent engine overhaul, as well as to the occurrence of pre-ignition and detonation during engine operation, is the build-up of foreign deposits in the combustion chambers and the exhaust valve passages thereof. These foreign deposits comprise chiefly lead and carbon, and primarily result from the improper burning of the air fuel mixture within the combustion chambers of the engine.

Another serious disadvantage of the conventional internal combustion engine lies in the excessive amount of noxious and harmful components normally found in exhaust gases expelled therefrom. These components generally comprise carbon monoxide, numerous aldehydes and hydrocarbons, and gasoline and oil vapors. The deleterious effects these noxious components may have upon both drivers and passengers of an improperly ventilated internal combustion engine-driven vehicle are well-known. Also well-known is the contribution of these noxious components to air pollution in metropolitan areas having heavily traveled thoroughfares. The existence of such noxious components result primarily from the improper and incomplete burning of the gaseous fuel mixture entering the engine.

It is the purpose of the present invention to overcome the aforementioned problems involved with the use of the conventional internal combustion engine, as well as additional problems resulting from such use, by the provision of a novel method and apparatus for diluting the gaseous fuel mixture of an engine with exhaust gases re-cycled through the engine under strictly controlled conditions.

In carrying out one phase of the present invention, exhaust gases from an internal combustion engine are introduced below the carburetor of the engine so as to counteract the pressure and temperature drop which takes place in the gaseous fuel mixture after it has passed through the carburetor into the intake manifold. Such introduction of the heated exhaust gases effects the molecular separation of the gaseous fuel mixture within the intake manifold. Hence, the precipitation of the unsaturated components of the gaseous fuel mixture is restrained whereby the tendency to build up foreign deposits within the intake manifold and intake valve passages is likewise diminished. This molecular separation of the gaseous fuel mixture components, coupled with the tendency of the inert exhaust gases per se to reduce the rate of flame propagation within the combustion chambers of the engine, produces a more complete burning of the gaseous fuel mixture. The more complete burning of the fuel mixture effects a reduced rate of foreign deposit formation within the combustion chambers and exhaust valve passages, as well as a substantial reduction in the percentages of carbon monoxide and other noxious components contained in the gases expelled from the combustion chambers. Additionally, this more complete burning permits increased power per unit of fuel to be obtained from the engine. It should likewise be noted that where tetra-ethyl fuel is being utilized, by re-cycling exhaust gases through the engine, the lead deposits which would normally build up in the combustion chambers are reduced in both density and structure to the point where periodic sluffing takes place. This latter phenomena is partly due to the water injection which results from the re-cycling of the exhaust gases through the combustion chambers; a certain amount of water vapor always being present in the exhaust gases.

The foregoing discussion pertains to the operation of both stationary type internal combustion engines and to internal combustion engines utilized in powering vehicles. It should also be noted, however, that the present invention contemplates the solution of a major problem which is peculiar to the operation of internal combustion engines utilized in powering vehicles. During the deceleration of such a vehicle, as where it is coasting down a hill, its engine tends to be rapidly cooled whereby at such time as it is again called upon to transmit power to the vehicle, a certain amount of heat must be transferred thereto in order to again bring it up to its normal operating temperature. The energy required to effect this temperature rise represents an important loss of fuel inasmuch as such energy cannot be utilized for power.

Another disadvantage resulting from this rapid engine cooling is the tendency of the spark plugs to become fouled. Additionally, during deceleration there is a tendency of the oil in the oil sump to be sucked upwardly past the piston rings due to the high vacuum existing in the intake manifold and hence within the combustion chambers at this time. This high vacuum also tends to suck an appreciable quantity of non-utilized fuel through the carburetor into the intake manifold, which fuel represents a loss.

The present invention contemplates elimination of these deceleration problems by the introduction of re-cycled exhaust gases into the combustion chambers of the engine whereby the latter will tend to remain near its normal operating temperature. Thus will the aforementioned fuel losses and spark plug fouling be corrected. Moreover, the introduction of these exhaust gases into the engine combustion chambers will impose a more nearly atmospheric pressure on the tops of the pistons, which pressure will resist upward movement of the oil from the oil sump past the piston rings. The existence of this more nearly atmospheric pressure within the intake manifold will also reduce the rate at which the gaseous fuel mixture is sucked thereinto from the carburetor.

Although there have heretofore been proposed several arrangements for diluting the gaseous fuel mixture of an internal combustion engine by re-cycling exhaust gases therethrough so as to thereby overcome the aforedescribed disadvantages, such arrangements have not proven satisfactory in actual use whereby they have not come into wide public acceptance. Demonstrations have established that such arrangements were not as efficacious as anticipated, primarily because they lack proper control and because they have introduced other problems and objectionable features.

It is a major object of the present invention to provide an improved method and apparatus for introducing exhaust gases to the combustion chambers of an internal combustion engine which will provide the aforementioned advantages and yet will not interfere with the normal operation of the engine with which it is utilized.

It is another object of the present invention to provide apparatus of the aforedescribed nature having novel means for automatically controlling the proportions and the time of admission at which such exhaust gas is introduced into the gaseous fuel mixture entering the engine's combustion chambers in response to the various operating conditions of the engine.

A further object of the present invention is to provide apparatus of the foregoing nature having novel means for dampening out surges normally resulting from the rapid opening and closing of the intake and exhaust valves of the engine in which it is used whereby a smooth flow of fuel mixture into the combustion chambers of the engine may take place.

Another object of the present invention is to provide apparatus of the aforementioned nature which may be readily installed on the existing conventional internal combustion engines by a semi-skilled mechanic, and which may be easily incorporated as original equipment on new engines during the latters' manufacture.

Yet a further object of the present invention is to provide apparatus of the aforementioned nature by the use of which exhaust gases will be admitted to the engine's combustion chambers only when required in order to effect maximum volumetric efficiency of the engine, and at all other times such gases will pass out the exhaust pipe in the usual manner.

It is an additional object of the present invention to provide apparatus of the aforementioned nature which is of simple design having few working parts whereby it may be fabricated of readily obtainable material by comparatively simple manufacturing processes, and hence may be sold at a comparatively low price.

It is yet another object of the present invention to provide apparatus of the aforementioned nature which will not require other than minor adjustments after being installed on an engine, and which is sturdy of construction whereby it may afford a long and trouble-free service life.

Other objects and advantages of the present invention will become apparent from the following detailed description taken in conjunction with the appended drawings wherein:

Figure 2 is an enlarged central vertical sectional view of the mixture control apparatus shown in Figure 1;

Figure 3 is a further enlarged vertical sectional view of a control valve which may be utilized with the mixture control apparatus of Figures 1 and 2;

Figure 4 is a fragmentary vertical sectional view of a modification of the control valve shown in Figure 3;

Figure 5 is a fragmentary vertical sectional view of an alternate form of the mixture control apparatus shown in Figure 2;

Figure 8 is a fragmentary vertical sectional view showing the elements of the control valve of Figure 7 disposed in a different operating position;

Figure 9 is a fragmentary vertical sectional view showing the elements of the control valve of Figures 7 and 8 in yet another operating position;

Figure 10 is a fragmentary vertical sectional view showing a modification of the control valve shown in Figures 7 through 9; and, Figure 11 is a reduced central vertical sectional view of yet another form of the mixture control apparatus disclosed in Figure 2.

GENERAL ARRANGEMENT

Figure 1:
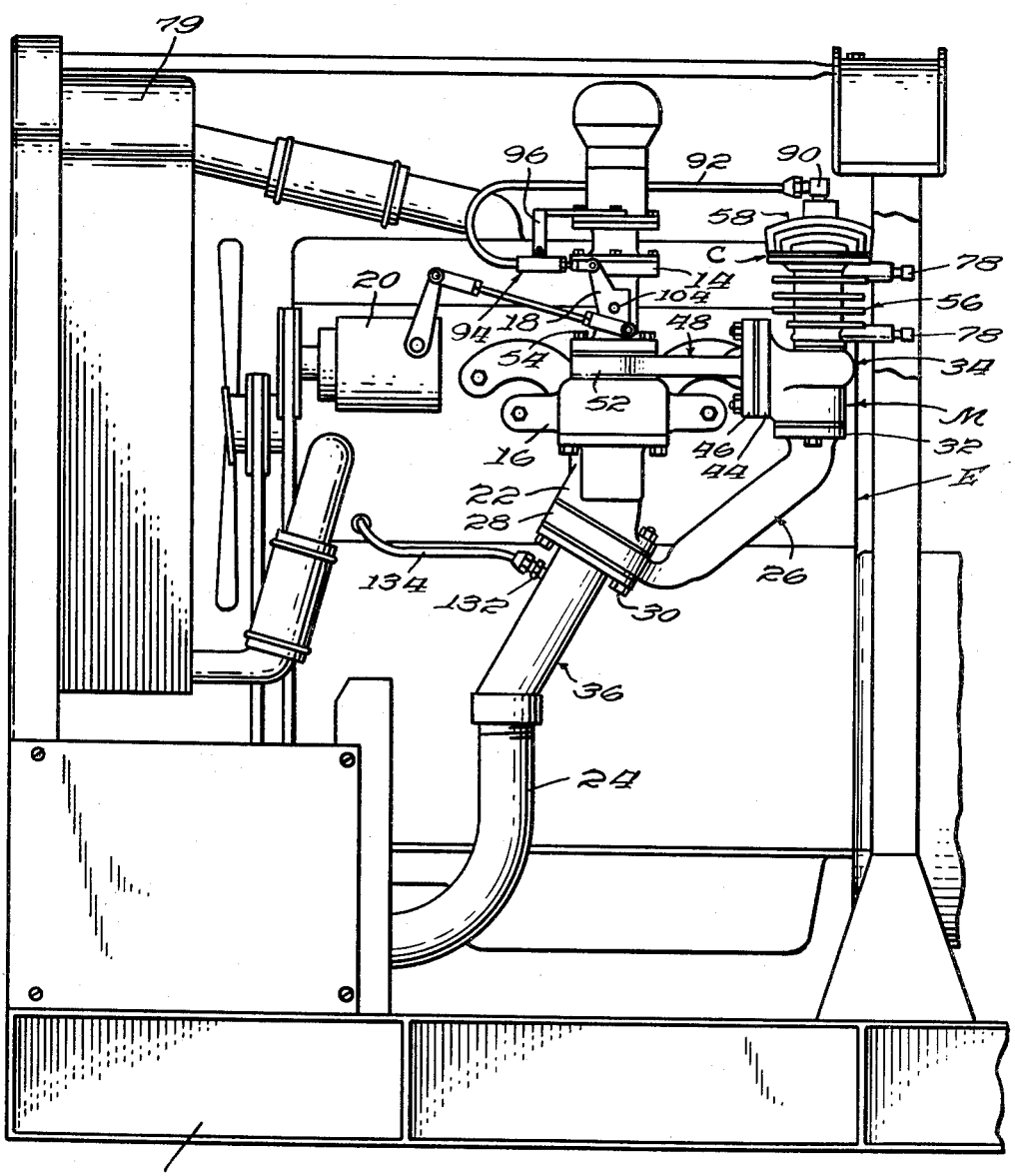
Figure 1 is a side elevational view of a stationary type internal combustion engine mounting mixture control apparatus embodying the present invention.

Referring to the drawings, and particularly to Figure 1 thereof, there is shown a conventional internal combustion engine E of the stationary type mounted on a base 11, which engine mounts a carburetor 14 upon an intake manifold 16. The carburetor 14 includes a throttle arm 18, the action of which is controlled by a governor 20 as well as by a set of hand controls (not shown). An exhaust manifold 22 is disposed below the intake manifold 16 and is in communication with an exhaust pipe 24. The mixture control apparatus embodying the present invention is generally designated M and is seen to be mounted at one side of the engine E.

Referring now to Figure 2, the mixture control apparatus M broadly comprises means defining a passage P interconnecting the intake manifold 16 and the exhaust manifold 22, a valve V disposed in the passage P, and means partially enclosed within a casing C adapted to effect movement of the valve V in response to the throttle setting and load conditions of the engine E so as to control the amount of exhaust gas allowed to pass through the passage P from the exhaust manifold 22 to the intake manifold 16.

Description of Figures 1 through 4

More particularly, the lower portion of the passage P is seen to be defined by pipe means, generally designated 26, having a flat portion 28 formed at its lower end, which flat portion is adapted to be rigidly secured to the underside of the exhaust manifold 22, as by means of bolt and nut combinations 30. The upper portion of the pipe means 26 includes a flange 32 adapted to be rigidly secured to the under side of a support block, or valve body, generally designated 34. A Venturi tube, generally designated 36, is interposed between the underside of the flat portion 28 of the pipe means 26 and the upper end of the exhaust pipe 24, for a purpose to be fully set forth hereinafter.

The lower portion of the support box 34 is shown formed with a vertically extending valve bore 38 wherein is disposed the valve V. In the preferred form of the invention, the valve V will consist of a butterfly valve, designated 40 in Figure 2, which valve is pivotally mounted for limited rotational movement about a horizontal axis, as by a pin 41. The upper portion of the support block 34 is of hollow construction defining an enclosure 42. A flange 44 is formed at one side of the support block. This flange 44 is adapted to be rigidly secured to a complementary flange 46 formed upon one side of an adaptor member, generally designated 48, as by means of bolt and nut combinations 50. The adaptor 48 is of hollow construction and preferably is of generally rectangular vertical cross-section except in the vicinity of flange 46. This adaptor includes at its end opposite the flange 46, an enlarged portion 52 adapted to be interposed between the underside of the carburetor 14 and the top of the intake manifold 16. It may be rigidly held in this position, as by means of stud bolts 54.

The casing C will preferably comprise a finned cylinder, generally designated 56, and a cylinder head, generally designated 58, rigidly secured to the top of the cylinder. The upper portion of the cylinder 56 and the underside of the cylinder head 58 cooperate to define a chamber 60. A pressure-responsive wall, such as a flexible diaphragm 61, extends across the chamber 60 so as to divide it into an upper portion 62 and a lower portion 63. The cylinder 56 is shown centrally formed with an axial rod passage 64 wherein is coaxially disposed a vertically extending rod 66. It should be particularly noted that the diameter of the rod 66 is appreciably smaller than the diameter of the passage 64. The lower end of the rod 66 is pivotally secured to a pivot link 68; the opposite end of this link being pivotally connected to the butterfly valve 40. The upper end of the rod rigidly mounts a retainer element 70 adapted to secure the upper end of a coil spring 72 interposed between the underside of the retainer 70 and the cylinder 58. Preferably, the spring 72 will be positioned within a cylindrical pocket 73. With this arrangement the rod will normally be biased upwardly whereby the valve 40 will normally be biased toward its closed position, as shown in Figure 2.

In order to assist in the cooling of the cylinder 56, and particularly the rod passage 64 thereof, the cylinder is preferably formed with a coaxial annular water passage 74. The upper and lower portions of this water passage 74 are seen to be in communication with a pair of elbows 76, which elbows are adapted to threadedly receive a pair of fittings 78 whereby the interior of the water passage may be placed in communication with a source of flowing cooling water. Conveniently, such source of cooling water may be the radiator 79 utilized to cool the engine E.

The diaphragm 61 may be formed of any suitable heat-resistant material capable of withstanding repeated flexures under the influence of fluid pressure differentials imposed upon tis opposite sides. The central portion of the diaphragm 61 is seen to be rigidly sandwiched between a pair of rigid discs 80, as by means of rivets 82. It should be particularly noted that a vertical perforation 84 extends through the discs 80 and the diaphragm 62 whereby the opposite sides of the latter are in communication. The purpose of such perforation will be fully set forth hereinafter. The cylinder head 58 is centrally formed with a vertical bore 86, which bore merges at its upper end into a threaded socket 88. An L-shaped fitting 90 is shown threaded into the socket 88. This fitting 90 rigidly mounts one end of a length of tubing 92, the opposite end of such tubing being connected to a control valve, generally designated 94.

The control valve 94 is shown rigidly affixed to the carburetor 14 by means of a bracket 96, and its preferred form of construction is disclosed in Figure 3. It should be noted that this control valve 94 includes an aperture 98 exposed upon one side to the atmosphere. It should be further noted that the present invention contemplates means for varying the size of the aperture 98 in accordance with the throttle setting of the engine E. To this end, there is shown disposed in the aperture 98, a barrier element in the form of a tapered needle 100 adapted for axial movement relative to the aperture. This needle is preferably threadedly secured within one end of a small cylinder 102. The opposite end of this cylinder 102 is shown slidably supported by a lug element 101, which lug element is in turn pivotally connected to the upper end of the throttle arm 18. A coil compression spring 103 disposed within the cylinder 102 serves to bias the lug element 101 toward the throttle arm. With this arrangement, clockwise rotation of the throttle arm 18 about its pivot pin 104 as the throttle is advanced will cause the needle 100 to be moved to the right, in the drawings, relative to the aperture 98 so as to increase the effective exposed area of the aperture. The preferred form of control valve 94 shown in Figure 3 includes a sleeve 106 wherein is formed an opening 108 permitting communication between the interior of the sleeve and the atmosphere. The aperture 98 may be coaxially formed in a transverse partition 110 shown threadedly secured within the sleeve 106. A closure member 112 is seen to be threadedly secured within the end of the sleeve opposite that connected to the tubing 92, which closure member is formed with a coaxial bore 114. The tapered needle 100 is seen to be axially slidably carried within the bore 114. The needle 100 may be axially adjusted relative to the aperture 98 by virtue of its threaded connection to the cylinder 102. The spring 103 is designed to prevent inadvertent jamming of the needle within the aperture 98 upon return of the throttle arm to its idling position when the needle has been improperly axially adjusted.

In Figure 4 there is shown a modification of the preferred form of control valve 94. In this modification the small end of the tapered needle 100a slidably mounts a stopper element 116 for axial movement relative thereto. This stopper 116 is normally biased away from the small end of the needle as by means of a helical spring 118 secured to the small end of the needle. The remainder of the elements of this form of control valve may be similar to those of the preferred form of control valve shown in Figure 3.

*Operation of Figures 1 through 4*

Before describing the operation of the embodiment of the present invention shown in Figures 1 through 4, it should be pointed out that it has been discovered that exhaust gas should be admitted to the combustion chambers of an internal combustion engine only during less than near-full throttle settings and not during near-full to full throttle settings. This is true since during near-full to full throttle operating conditions the engine will be functioning at its maximum volumetric efficiency whereby substantially all of the gaseous fuel mixture forced into the engine's combustion chambers will be completely burned during the power stroke of the engine. Accordingly, the apparatus shown in Figures 1 through 4 of the drawings incorporates means for opening the valve 40 only during less than near-full throttle settings, and for closing this valve as soon as the throttle has been advanced to a near-full position.

Referring now to Figure 2, at such time as the engine E is inoperative, the valve 40 will be biased to a closed position by the spring 72. Hence, the passage P will be closed until the engine is started. When the engine is started, however, and the throttle is moved to its idling setting, a comparatively high vacuum will be created within the engine's intake manifold 16. This vacuum will be transferred to the lower portion 63 of the chamber 60 by means of the hollow interior of the adaptor 48, the enclosure 42, and the portion of the rod passage 64 outwardly of the rod 66. Hence, the underside of the diaphragm 61 will be subjected to a negative pressure. At the same time, the upper side of the diaphragm 61 will be exposed to atmospheric, or positive, pressure by means of the control valve 94 and tubing 92; the needle 100 being disposed in its idling position shown in Figure 3 whereby atmosphere is free to pass through the free area 119 of the aperture 98. Accordingly, the diaphragm, and hence the discs 80, will be caused to flex downwardly within the chamber 60, as indicated by the dotted line showing of Figure 2. As this downward flexure takes place, abutment of the lower disc 80 with the top of the retainer 70 will effect concurrent downward movement of the rod 66 whereby the valve 40 will be caused to undergo limited clockwise rotation about its pivot pin 41 into a partially open position, as indicated in dotted outline in Figure 2. Exhaust gas from the exhaust manifold 22 will then be admitted through the passage P to the intake manifold 60.

Referring now to Figure 3, when the throttle is advanced past its idling position the throttle arm 18 will be rotated clockwise about its pivot pin 104 so as to effect movement of the lug element 101, the cylinder 102, and hence the tapered needle 100 to the right in the drawings relative to the aperture 98. Such movement of the needle will serve to gradually increase the effective area of the aperture 98 as the throttle is advanced whereby there will be an increase in the downward force exerted upon the upper surface of the diaphragm. At the same time, however, the intake manifold vacuum will decrease whereby the negative pressure below the diaphragm will be less than that existing during idling conditions. Accordingly, as the throttle is advanced from its idling setting to a near-full setting, the diaphragm will gradually open the valve 120 wider than its dotted line position of Figure 2, then gradually return the valve to a closed position. When the throttle has been completely advanced to its near-full setting, the intake manifold pressure will be insufficient to cause downward flexure of the diaphragm against the force of the spring 72 despite the effect of the atmosphere upon the top of the diaphragm. Accordingly, the spring 72 will cause the rod to return to its original raised position whereby the valve 40 will be caused to return to its original closed position shown in Figure 2. The flow of exhaust gas through the passage P will then be cut off.

At this point it should be particularly noted that the perforation 84 formed in the diaphragm 61 serves a very important purpose. It will be understood that the rapid opening and closing of the intake valves of the engine tends to create rapid and violent pressure surges within the intake manifold 16, which surges are transferred to the chamber 60 by virtue of its communication with the intake manifold. If the diaphragm was not perforated, these rapid surges would tend to cause sympathetic fluctuations of the diaphragm. If the diaphragm is formed with a perforation 84, however, such sympathetic movement is effectively dampened out whereby it will remain substantially unaffected by the existence of such surges. The perforation 84 also serves to admit atmosphere to the rod passage 64 whereby its cooling is aided and the danger of the rod 66 becoming stuck therein is thereby diminished.

It should also be noted that the present invention contemplates means for increasing the vaporization of the gaseous fuel mixture as it passes from the carburetor 14 into the intake manifold 16 of the engine. To this end, there may be provided a cup-shaped element 121 shown disposed within the enlarged portion 52 of the adaptor 48. This cup-shaped element 121 includes a sleeve 122 having a diameter smaller than the diameter of an aligned bore 124 formed in the lower wall of the enlarged portion 52. Accordingly, exhaust gas admitted through the passage P will circulate about the exterior of the sleeve 122 so as to effect its heating. Thereafter, this gas will pass downwardly through bore 124 into the intake manifold. The gaseous fuel mixture flowing downwardly through the sleeve 122 will be heated by contact therewith whereby vaporization of such mixture will be increased. Such vaporization will be further increased within the intake manifold by direct contact of this vaporous fuel mixture with the hot exhaust gas. The venturi tube 36, it should be noted, serves a very important function with regard to the operation of the apparatus of the present invention. In this regard it will be realized that the opening and closing of the exhaust valves of the engine E tends to create rapid and violent pressure surges within the exhaust manifold 22, which surges are transferred to the interior of the pipe means 26 by virtue of its connection thereto. By positioning the venturi tube 36 adjacent the opening 129 of the exhaust manifold, these pressure surges are largely dampened. The dampening of these pressure surges effectively protects the diaphragm 61 from damage which could result when the valve V is in an open position; the diaphragm then being in communication with the exhaust manifold. Such dampening likewise protects the valve V from possible damage by these pressure surges.

Referring now to Figure 2, the venturi tube 36 is formed at its throat portion 128 with an annular collecting passage 129 wherein is formed a threaded port 130. This port 130 is adapted to receive an externally threaded fitting 132, which fitting is secured to one end of a length of tubing 134. The opposite end of the length of tubing 134 is connected to the crank case of the engine. With this arrangement, the venturi tube serves to scavenge the crank case of water, acid and lacquer vapors whereby the efficiency and service life of the engine may be considerably benefited. It should be noted that the crank case scavenging effect of the venturi tube increases with the load imposed upon the engine, inasmuch as any such load increase will effect a corresponding increase in the exhaust gas flow through the venturi tube. This is an important consideration since generally the need for crank case scavenging increases with the load imposed upon the engine. The positioning of the venturi tube adjacent the pipe means 26 likewise tends to dampen out the flow of exhaust gas surges from the exhaust manifold whereby these surges will exert less force upon the valve 40 and the diaphram 61.

*Description of Figure 5*

In Figure 5 there is shown a fragmentary vertical sectional view of an alternate form of valve V' which may be utilized with the mixture control apparatus shown in Figures 1 through 4. The valve V' is seen to be of the poppet type having a main body 135 rigidly secured to the lower end of a stem 136. The stem 136 corresponds to the rod 66 shown in Figure 2 and may be connected at its upper end to a pressure-responsive wall, such as the diaphragm 61 disclosed in Figure 2, whereby vertical flexure of such diaphragm may effect concurrent vertical movement of the stem 136 and hence movement of the valve V' to its open position indicated by the dotted line showing of Figure 5. The support block 34b is shown formed with a tapered valve seat 138 adapted to be engaged by the valve body 135 when its stem 136 is in its raised position whereby flow of exhaust gas through the support block will be cut off.

*Description of Figures 6 through 9*

Figure 6:
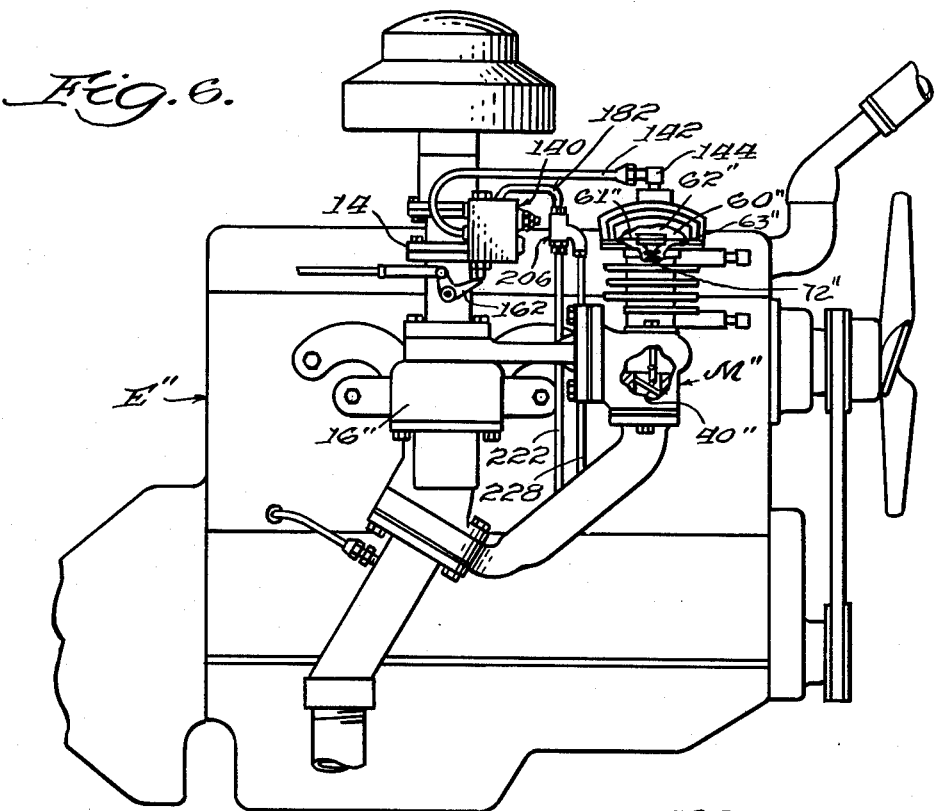
Figure 6 is a side elevational view, partly broken away in section, showing an internal combustion engine adapted for use in powering a vehicle, which engine mounts mixture control apparatus embodying the present invention.

In Figure 6 there is shown a side elevational view of an internal combustion engine E" adapted for use in an automobile, truck, bus, or the like, which engine mounts a mixture control apparatus M" similar to that described hereinbefore. While the mixture control apparatus M shown in Figures 1 through 4 is suitable for use with a stationary type engine, it should be understood that this apparatus is not completely suited for use with an engine used in powering a vehicle. In this regard it has been determined that at such time as the vehicle wherein the engine E" is mounted is decelerated, exhaust gas in comparatively large quantities should be admitted into the combustion chambers of such engine. To this end, this form of the present invention contemplates a control valve, generally designated 140, of different construction than the control valve 94 shown in the foregoing figures. This control valve 140 includes means for automatically increasing the downward force imposed upon the upper surface of the diaphragm during deceleration conditions whereby the valve 40" will be caused to open and admit exhaust gas into the intake manifold 16".

Figure 7:
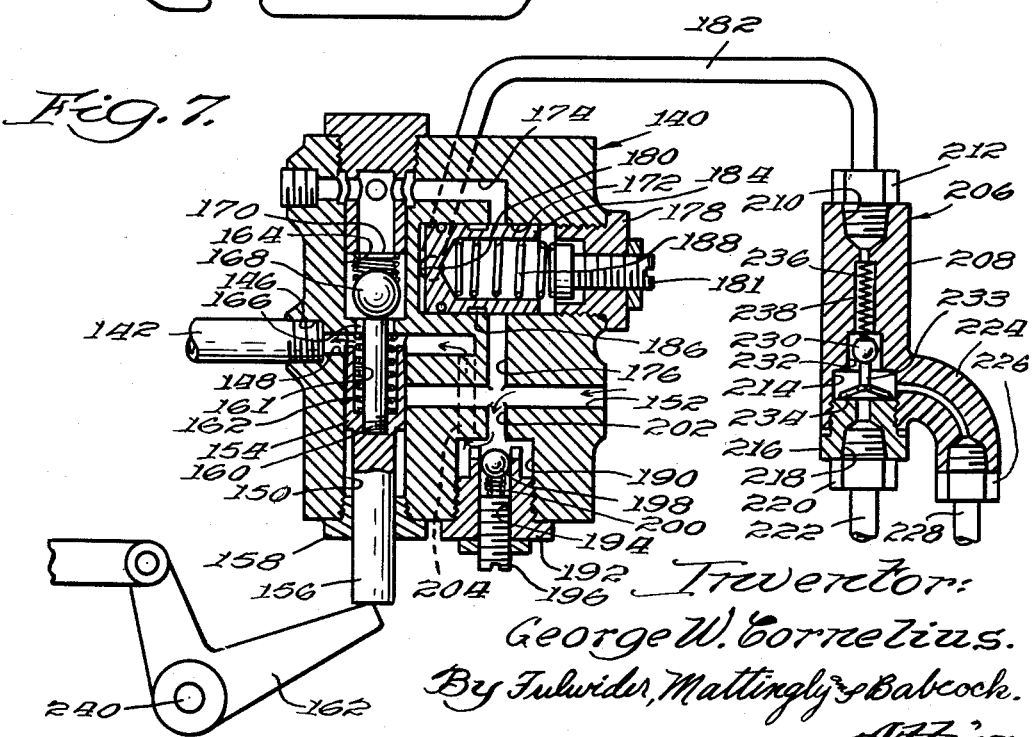
Figure 7 is an enlarged vertical sectional view of a control valve which may be utilized with the mixture control apparatus shown in Figure 6.

The preferred form of control valve, generally designated 140, is shown rigidly mounted to one side of the carburetor 14, and will be connected to the upper portion 62" of the chamber 60" by means of a length of tubing 142 and an L-shaped fitting 144. Referring to Figure 7, the body of this control valve is seen to be formed with a threaded socket 146 which threadedly receives the end of tubing 142. This socket 146 is in communicaiton with an aperture passage 148, which aperture passage in turn intersects a vertically extending main bore 150. The main bore 150 is shown in communication with the atmosphere by means of a horizontal passage 152. A frusto-conical barrier element 154 is seen to be vertically slidably mounted within the main bore 150. This barrier element 154 preferably includes a downwardly extending bar element 156 which is slidably carried within a guide nut 158; the lower portion of said bar depending underneath this guide nut. An upstanding pin 160 is rigidly carried within a cylindrical depression 161 formed in the upper portion of element 156. A helical coil spring 162 disposed in depression 161 serves to constantly bias the barrier element downwardly. The barrier element is movable vertically within the main bore 150 against the force of spring 162 by virtue of the abutment of the lower end of bar 156 with the throttle link 162.

The control valve body 140 is also seen to be formed with an auxiliary bore 164 coaxial to the main bore 150 and in communication therewith by a counterbore 166. The lower portion of the auxiliary bore 164 houses a ball check 168, which ball check is normally biased downwardly by a helical coil spring 170. The control valve body is additionally formed with a second auxiliary bore 172 shown disposed at right angles to the auxiliary bore 164 and connected therewith as by a passage 174. The second auxiliary bore 172 is shown in communication with horizontal passage 152, and hence the atmosphere by a second passage 176. A closure member 178 may be threadedly secured within one end of the second auxiliary bore 172, while a port 180 is seen to be formed in the opposite end of the second auxiliary bore. The closure member 178 mounts a set screw 181. The port 180 is connected to a length of tubing 182 for a purpose to be set forth hereinafter. A piston 184 formed with an annular groove 186 is shown slidably mounted within the second auxiliary bore 172. This piston is normally biased toward the end of the bore wherein is formed the port 180, as by a helical coil spring 188. The lower portion of the control valve body 140 is shown formed with a bore 190 wherein is threadedly secured a closure plug 192 having a coaxial bore 194. A set screw 196 is mounted in the lower portion of the bore 194, and a second ball check 198 is disposed in the upper portion thereof. A helical coil spring 200 normally biases the ball check 198 upwardly to seat against the lower end of a short passage 202, which short passage interconnects the bore 190 with the horizontal passage 152. The bore 190 is also shown connected to one end of the aperture passage 148 as by a vertical passage 204.

The end of the tubing 182 opposite port 180 is shown secured to the top of a heat-sensitive valve, generally designated 206. This valve 206 may comprise a main body 208 formed at its upper portion with a threaded socket 210 adapted to receive a fitting 212 mounted by the tubing 182, and at its lower end with a cylindrical cavity 214. A plug 216 is shown threadedly mounted within the lower portion of the cavity 214, which plug 216 includes a threaded socket 218 adapted to receive a fitting 220 mounted by the upper end of another length of tubing 222. The lower portion of the main body 208 is also seen to be formed with an internally threaded elbow 224. This elbow 224 is adapted to receive a fitting 226 mounted by the upper end of yet another length of tubing 228. The lower ends of the tubing lengths 222 and 228 are adapted to be connected to the oil supply of the engine E' whereby when the engine is operating, oil from such supply will circulate through the upper portion of the cavity 214.

A ball check 230 is shown disposed within a portion 232 of reduced diameter of the cavity 214. This ball check is supported upon a post 233, which post in turn is secured to a normally upwardly flexed bi-metal temperature-sensing element 234 positioned in the cavity 214. A helical coil spring 236 disposed within a bore 238 connecting the cavity 214 and socket 210 normally biases the ball check 230 downwardly. The relative strengths of the bi-metal element 234 and the spring 236 should be so chosen that the ball check will be caused to seat against the lower end of bore 238 until such time as the temperature of the oil flowing through the cavity has reached a predetermined value, whereupon the bi-metal element will tend to flatten out so that the spring 238 may unseat the ball check.

Although the form of heat-sensitive valve 206 disclosed in Figure 7 has proven satisfactory, it should be understood that other suitable valves of this nature may also be utilized. The purpose of this valve will be fully set forth hereinafter in connection with the description of the operation of Figures 6 through 9.

*Operation of Figures 6 through 9*

As stated previously hereinbefore, the control valve 140 is especially adapted to admit exhaust gas into the intake manifold 16" of the engine E' at such time as the vehicle mounting such engine is decelerating. Additionally, this control valve serves to admit exhaust gas into the intake manifold during other less than near-full throttle settings of the engine. To this end, the control valve is adapted to connect the upper portion 62" of the chamber 60" with the atmosphere in accordance with the throttle setting and rotational speed of the engine.

Referring again to Figure 7, the parts of the control valve 140 are shown disposed in the positions they assume when the throttle is in its idling setting. At this time, as indicated by the arrows, the only path connecting the aperture passage 148 (and hence the upper portion 62" of the chamber 60") with the atmosphere, consists of an idling duct made up of the vertical passage 204, the bore 190, the short passage 202, and the horizontal passage 152. The ball check 198 at this time will be urged downwardly off its seat by the rush of air through the aforedescribed diaphragm perforation 80, such air being sucked into the intake manifold 16" of the engine E" by virtue of the pressure differential existing between the lower chamber portion 63" and the atmosphere. Accordingly, the upper surface of the diaphragm 61" will be subjected to a downward force from such atmosphere, the underside thereof being in communication with the comparatively high vacuum existing with the intake manifold at this time. The diaphragm 61" will therefore be caused to undergo downward flexure whereby the valve 40" will be opened to admit a certain amount of exhaust gas into the intake manifold. The set screw 196 may be adjusted so as to control the quantity of air admitted past ball check 198 during idling of the engine E".

Referring now to Figure 8, the throttle has been advanced past its idling setting whereby the throttle link 162 has been rotated farther clockwise about its pivot pin 240. Such movement of the throttle link allows the spring 162 to force the frusto-conical barrier element 154 downwardly within the main bore 150, hence, the atmospheric air may flow through horizontal passage 152 and the upper portion of the main bore 150 into the aperture passage 148, as indicated by the arrows. It will be observed that during downward movement of the throttle link the effective area of the main bore 150 exposed to the atmosphere by means of the horizontal passage 152 will be gradually increased because of the tapered configuration of the barrier element. Hence, as the throttle is advanced, the downwardly acting force exerted upon the upper surface of the diaphragm 61" will also be gradually increased. At the same time, however, the intake manifold pressure will be decreasing whereby the negative pressure acting upon the underside of the diaphragm will be diminishing. Hence, as has been explained in connection with reference to Figure 2, as the throttle is advanced, the valve 40" will be gradually opened then moved toward a closed position until such time as the throttle has been advanced to its near-full setting, whereupon the spring 72" will be able to urge the valve 40" to a closed position. The flow of exhaust gas into the intake manifold will then be completely cut off.

Referring now to Figure 9, the parts of the control valve 140 are shown disposed in the positions they assume during deceleration of the engine E". It will be seen that the throttle link 162 has returned to its original position whereby the barrier element 154 has also been returned to its original position in which original position the barrier element 154 blocks the flow of atmosphere through the horizontal passage 152. It will also be seen that the piston 184 has been moved away from the port 180 whereby its annular groove 186 is in alignment with the passage 176. Likewise, the ball check 168 has been unseated from the top of counterbore 166 by the pin 160. Hence, the aperture passage 148 will be placed in communication with the atmosphere by means of a decelerating duct consisting of the auxiliary bore 164, the passage 174, the piston groove 186, the second passage 176, and the horizontal passage 152, as indicated by the arrows. Accordingly, since the intake manifold pressure will be comparatively low during deceleration, there will exist a high fluid pressure differential between the top and bottom of the diaphragm 61". This differential will effect downward flexure of the diaphragm whereby the valve 40" will be opened and exhaust gas admitted to the intake manifold 16". Inasmuch as the effective area of the aperture passage 148 exposed to the atmosphere, as well as the intake manifold pressure, will be greater during these deceleration conditions than during idling conditions, more exhaust gas will be admitted to the intake manifold during deceleration than during idling of the engine E".

In the embodiment of the invention shown in Figures 7 through 9, the piston 184 is adapted to be moved within the auxiliary counterbore 172 so as to align its groove 186 with the passage 176 by virtue of the interconnection of this counterbore with the oil supply of the engine E" through port 180, tubing 182, valve 206, and tubing lengths 222 and 228. With this arrangement, the oil pressure of the engine will be caused to act against the left side of the piston so as to cause it to be urged away from the port 180 against the force of the spring 188. The set screw 131 is adapted to be adjustable whereby such piston movement may be caused to occur when the rotational speed of the engine has increased to a desired value above idling.

Although the port 180 may be directly connected to the oil supply of the engine E", it is preferable to interpose a heat-sensitive valve such as that designated 206 in Figure 7 between this port and the engine's oil supply. Such a valve serves to prevent the undesired movement of the piston 184 which could occur before the oil supply of the engine E" has reached its operating temperature; the pressure of such oil being considerably higher at any given rotational speed of the engine when it is cold than when it is hot. The ball check 230 of valve 206 is adapted to block the transfer of oil pressure to the second auxiliary bore 172 until such time as the oil supply has reached a predetermined temperature, at which time the oil flowing through the cavity will cause the temperature-sensing element 234 to straighten out. The ball check 230 will then be urged downwardly by the spring 236 whereby the pressure of the oil may be communicated to the auxiliary bore 172 by tubing 182 and port 180.

*Description of Figure 10*

Although the preferred manner of effecting movement of the piston 184 within the second auxiliary bore 172 utilizes the pressure of the engine's oil supply, other means may be provided for effecting such piston movement in response to the increase of the rotational speed of the engine above a predetermined value. Thus, in Figure 10 there is shown a portion of a modified control valve generally designated 140$^c$, having a piston 184$^c$ shown attached to an electric solenoid 246, which solenoid is in turn connected to the electric generator (not shown) of the engine, as by wires 248. With this arrangement, the solenoid 246 may be so adjusted that at idling speed the spring 188$^c$ will maintain the piston 184$^c$ disposed to the left side of the second auxiliary bore 172$^c$. As the rotational speed of the engine is increased above idling, however, the electric generator will produce sufficient electric current to cause the solenoid 246 to move the piston 184$^c$ to the right whereby its annular groove 186$^c$ will come into alignment with the passage 176$^c$. The other elements of this control valve 140$^c$ may correspond to those of the aforedescribed control valve 140.

*Description of Figure 11*

In Figure 11 there is shown another form of mixture control apparatus M" embodying the present invention. This apparatus is seen to include a support block, or valve body, generally designated 250, which block rigidly mounts cylinder 252 having an integral head 254. The support block 250 is formed with a vertically extending valve bore 256, and with an enclosure 258 intersecting the top of this bore. The lower end of the valve bore 256 is in communication with the upper end of pipe means 26$^d$, and the enclosure is in communication with the interior of an adaptor 48$^d$; which pipe means and adaptor are similar to those described hereinbefore. A butterfly type valve 260 is shown pivotally mounted within the valve bore 256, as by a pin 262.

The cylinder 252 and head 254 are seen to define a chamber 264, which chamber is in communication with the enclosure 258, as by means of ports 266. Hence, the chamber is communicable with the intake manifold of the engine (not shown). The upper portion of the head 254 mounts an L-shaped fitting 268 whereby it may be connected by a length of tubing 270 to a suitable control valve, such as those shown in Figures 3, 4, 7 or 10, and described hereinbefore.

In this form of the invention, the pressure-responsive wall is seen to consist of a piston 272 slidably mounted for vertical reciprocation within the cylinder 252. Preferably, this piston 272 will be formed with a perforation 274, and it may incorporate one or more sealing rings 276. The piston 272 and the valve 260 may be interconnected by means of a rod 278 and a pivot link 280 whereby vertical movement of the piston will effect concurrent movement of the valve. A coil spring 282 may be utilized to bias the piston upwardly; the valve 260 thereby being normally biased toward a closed position relative to the valve bore 256. The intermediate portion of the rod 278 is shown slidably supported within a sleeve type bearing 284 mounted by the support block 250.

The operation of this form of the invention will be substantially similar to the operation of the mixture control apparatus shown in the preceding figures of the drawings. The primary operational difference of this form of the invention as compared to the others is that vertical movement of the piston 270 under the influence of a fluid pressure differential on its opposite sides will effect concurrent movement of the rod 278 and hence of the exhaust gas-admitting valve 260, rather than utilizing vertical flexure of the diaphragm 61 to effect movement of this valve. The relative dispositions of the piston 270 and the valve 260 when exhaust gas is being admitted into the intake manifold of the engine is shown in dotted outline in this figure.

As previously stated hereinbefore, it is the essential purpose of the present invention to provide an improved method and apparatus for automatically introducing exhaust gases into the combustion chambers of an internal combustion engine during less than near-full throttle operation of such engine. The advantages thereby afforded over conventional engine fueling practices have likewise been outlined heretofore. It should be particularly observed that although exhaust gas is shown herein as the conditioning means for diluting the gaseous fuel mixture entering the engine, other types of inert gases may also be utilized for this purpose. It should likewise be observed that although the specific embodiments herein shown and described are fully capable of providing the advantages and achieving the objects previously mentioned, such embodiments are merely illustrative and other modifications and changes may be made without departing from the spirit of the invention or the scope of the appended claims.

I claim:

1. Mixture control apparatus for use with an internal combustion engine having its exhaust and intake manifolds connected by a passage, comprising: a valve in said passage; a casing formed with a chamber; a pressure-responsive wall in said chamber adapted to undergo movement in response to the imposition upon its opposite sides of a fluid pressure differential; means connecting said wall and said valve whereby movement of said wall will effect concurrent movement of said valve between an open and a closed position relative to said passage; means for placing one side of said wall in communication with the intake manifold pressure of said engine; means including an aperture for placing the opposite side of said wall in communication with the atmosphere; and means for varying the size of said aperture in accordance with the throttle setting of said engine.

2. Mixture control apparatus for use with an internal combustion engine having its exhaust and intake manifolds connected by a passage, comprising: a valve in said passage; a casing formed with a chamber; a pressure-responsive wall in said chamber adapted to undergo movement in response to the imposition upon its opposite sides of a fluid pressure differential, said wall being formed with a perforation; means connecting said wall and said valve whereby movement of said wall will effect concurrent movement of said valve between an open and a closed position relative to said passage; means biasing said valve to a closed position; means for placing one side of said wall in communication with the intake manifold pressure of said engine; means including an aperture for placing the opposite side of said wall in communication with the atmosphere; and means for varying the size of said aperture in accordance with the throttle setting of said engine.

3. Mixture control apparatus for use with an internal combustion engine having its exhaust and intake manifolds connected by a passage, comprising: a valve in said passage; a casing formed with a chamber; a pressure-responsive wall in said chamber adapted to undergo movement in response to the imposition upon its opposite sides of a fluid pressure differential; means connecting said wall and said valve whereby movement of said wall will effect concurrent movement of said valve between an open and a closed position relative to said passage; means biasing said valve to a closed position; means for placing one side of said wall in communication with the intake manifold pressure of said engine; means including an aperture for placing the opposite side of said wall in communication with the atmosphere; and means for varying the size of said aperture in accordance with the throttle setting of said engine whereby said aperture will be closed when said engine is operating at near-full and full throttle conditions, and said aperture will be opened when said engine is operating at less than near-full throttle conditions.

4. Mixture control apparatus for use with an internal combustion engine having its exhaust and intake manifolds connected by a passage, comprising: a valve in said passage; a casing formed with a chamber; a pressure-responsive wall in said chamber adapted to undergo movement in response to the imposition upon its opposite sides of a fluid pressure differential; means connecting said wall and said valve whereby movement of said wall will effect concurrent movement of said valve between an open and a closed position relative to said passage; means biasing said valve to a closed position; means for placing one side of said wall in communication with the intake manifold pressure of said engine; means including an aperture for placing the opposite side of said wall in communication with the atmosphere; a barrier element disposed in said aperture, said element being gradually reduced in cross-sectional area along its length; and means interconnecting the throttle controls of said engine and said barrier element whereby said element may be moved longitudinally within said aperture so as to increase the effective area of said aperture as the throttle is advanced.

5. Mixture control apparatus for use with an internal combustion engine having its exhaust and intake manifolds connected by a passage, comprising: a valve in said passage; a casing formed with a chamber; a pressure-responsive wall in said chamber adapted to undergo movement in response to the imposition upon its opposite sides of a fluid pressure differential; means connecting said wall and said valve whereby movement of said wall will effect concurrent movement of said valve between an open and a closed position relative to said passage; spring means biasing said valve to a closed position; means for placing one side of said wall in communication with the intake manifold pressure of said engine; a sleeve; a conduit interconnecting the portion of said chamber enclosing the opposite side of said wall and one end of said sleeve; a transverse partition having a coaxial aperture disposed in said sleeve; a closure for the end of said sleeve opposite its conduit-connected end, said closure being coaxially bored; an opening to the atmosphere formed in said sleeve between said partition and said closure; a tapered needle coaxially slidably supported in said sleeve by means of the bore formed in said closure, the small end of said needle normally being disposed between said partition and the conduit-connected end of said sleeve; and means connecting said needle to the throttle linkage of said engine whereby as the throttle is opened the small end of said needle will be moved toward said closure.

6. Mixture control apparatus for use with an internal combustion engine having its exhaust and intake manifolds connected by a passage, comprising: a valve in said passage; a casing formed with a chamber; a pressure-responsive wall in said chamber adapted to undergo movement in response to the imposition upon its opposite sides of a fluid pressure differential; means connecting said wall and said valve whereby movement of said wall will effect concurrent movement of said valve between an open and a closed position relative to said passage; spring means biasing said valve to a closed position; means for placing one side of said wall in communication with the intake manifold pressure of said engine; a sleeve; a conduit interconnecting the portion of said chamber enclosing the opposite side of said wall and one end of said sleeve; a transverse partition having a coaxial aperture disposed in said sleeve; a closure for the end of said sleeve opposite its conduit-connected end, said closure being coaxially bored; an opening to the atmosphere formed in said sleeve between said partition and said closure; a tapered needle coaxially slidably supported in said sleeve by means of the bore formed in said closure, the small end of said needle normally being disposed between said partition and the conduit-connected end of said sleeve; means connecting said needle to the throttle linkage of said engine whereby as the throttle is opened the small end of said needle will be moved toward said closure; a stopper slidably mounted on the small end of said needle for axial movement thereon; and spring means biasing said stopper away from said small end whereby as the small end of said needle approaches said partition said stopper will plug said aperture so as to cut off communication between said chamber and the atmosphere during near-full and full throttle settings.

7. Mixture control apparatus for use with an internal combustion engine having its exhaust and intake manifolds connected by a passage, a comprising: a valve in said passage; a casing formed with a chamber; a pressure-responsive wall in said chamber adapted to undergo movement in response to the imposition upon its opposite sides of different fluid pressures, said wall being formed with a perforation; means connecting said wall and said valve whereby movement of said wall will effect concurrent movement of said valve between an open and a closed position relative to said passage; spring beans biasing said valve to a closed position; means for placing one side of said wall in communication with the intake manifold pressure of said engine; a control valve body formed with an aperture; conduit means interconnecting the opposite side of said wall and said aperture; a main bore formed in said body connecting said aperture to the atmosphere; barrier means in said bore for varying its effective area exposed to the atmosphere in response to the setting of the throttle of said engine, said barrier means serving to increase the effective area of said bore as said throttle is advanced; a first duct in said body connecting said aperture to the atmosphere independently of the position of said barrier means; a first blocking element in said first duct; biasing means normally urging said first blocking element to close said first duct; a second duct in said body connecting said aperture to the atmosphere; a second blocking element in said second duct; biasing means normally urging said second blocking element to close said second duct; means connected to said throttle for opening said second blocking element when said throttle is in idling position; plug means normally closing said second duct; and means for moving said plug means so as to open said second duct when the rotational speed of said engine increases above a predetermined value greater than idling.

8. Mixture control apparatus for use with an internal combustion engine having its exhaust and intake manifolds connected by a passage, comprising: a valve in said passage; a casing formed with a chamber; a pressure-responsive wall in said chamber adapted to undergo movement in response to the imposition upon its opposite sides of a fluid pressure differential, said wall being formed with a perforation; means connecting said wall and said valve whereby movement of said wall will effect concurrent movement of said valve between an open and a closed position relative to said passage; spring means biasing said valve to a closed position; a control valve body formed with an aperture; conduit means interconnecting the opposite side of said wall and said aperture; a main bore formed in said body connecting said aperture to the atmosphere; a frusto-conical barrier element coaxially slidably disposed within said bore, the smaller end of said barrier element being positioned proximate to said aperture; means interconnecting said barrier element and the throttle linkage of said engine whereby said element will be moved away from said aperture as the throttle is advanced so as to thereby gradually increase the effective area of said bore; an idling duct in said body connecting said aperture to the atmosphere independently of the position of said barrier element; a ball check in said idling duct; a spring normally biasing said ball check to a closed position; a decelerating duct in said body connecting said aperture to the atmosphere, said duct including an auxiliary bore coaxial to said main bore; a second ball check disposed in said auxiliary bore; a spring normally biasing said second ball check to a closed position; a pin mounted on said barrier element arranged to project into said auxiliary bore when said throttle linkage is in idling position so as to maintain said second ball check in an open position; a second auxiliary bore formed in said body and intersecting said deceleration duct, said bore being connectable at one of its ends with the oil pressure of said engine; a piston slidably mounted in said second auxiliary bore, said piston being formed with an annular groove; and spring means normally biasing said piston toward said one end of said second auxiliary bore in which position said piston will block said deceleration duct, said spring means having sufficient strength to maintain said piston in proximity to said one end of said bore until the oil pressure of said engine rises above a predetermined value whereby said piston will be urged away from said one end of said bore so as to align said annular groove with said deceleration duct.

9. Mixture control apparatus for use with an internal combustion engine having its exahust and intake manifolds connected by a passage, comprising: a valve in said passage; a casing formed with a chamber; a pressure-responsive wall in said chamber adapted to undergo movement in response to the imposition upon its opposite sides of a fluid pressure differential, said wall being formed with a perforation; means connecting said wall and said valve whereby movement of said wall will effect concurrent movement of said valve between an open and a closed position relative to said passage; spring means biasing said valve to a closed position; a control valve body formed with an aperture; conduit means interconnecting the opposite side of said wall and said aperture; a main bore formed in said body connecting said aperture to the atmosphere; a frusto-conical barrier element coaxially slidably disposed within said bore, the smaller end of said barrier element being positioned proximate to said aperture; means interconnecting said barrier element and the throttle linkage of said engine whereby said element will be moved away from said aperture as the throttle is advanced so as to thereby gradually increase the effective area of said bore; an idling duct in said body connecting said aperture to the atmosphere independently of the position of said barrier element; a ball check in said idling duct; a spring normally biasing said ball check to a closed position; a decelerating duct in said body connecting said aperture to the atmosphere, said duct including an auxiliary bore coaxial to said main bore; a second ball check disposed in said auxiliary bore; a spring normally biasing said second ball check to a closed position; a pin mounted on said barrier element arranged to project into said auxiliary bore when said throttle linkage is in idling position so as to maintain said second ball check in an open position; a second auxiliary bore formed in said body and intersecting said deceleration duct; a conduit for interconnecting said second auxiliary bore and the oil sump of said engine; valve means interposed in said conduit, said valve means including heat-sensitive means for blocking said conduit until the oil in said oil sump rises to a predetermined temperature; and spring means normally biasing said piston toward said one end of said second auxiliary bore, in which position said piston will block said deceleration duct, said spring means having sufficient strength to maintain said piston in proximity to said one end of said bore until the oil pressure of said engine rises above a predetermined value whereby said piston will be urged away from said one end of said bore so as to align said annular groove with said deceleration duct.

10. Mixture control apparatus for use with an internal combustion engine having its exhaust and intake manifolds connected by a passage, comprising: a valve in said passage; a casing formed with a chamber; a pressure-responsive wall in said chamber adapted to undergo movement in response to the imposition upon its opposite sides of different fluid pressures, said wall being formed with a perforation; means connecting said wall and said valve whereby movement of said valve between an open and a closed position relative to said passage; spring means biasing said valve to a closed position; means for placing one side of said wall in communication with the intake manifold pressure of said engine; a control valve body formed with an aperture; conduit means interconnecting the opposite side of said wall and said aperture; a main bore formed in said body connecting said aperture to the atmosphere; barrier means in said bore for varying its effective area exposed to the atmosphere in response to the setting of the throttle of said engine, said barrier means serving to increase the effective area of said bore as said throttle is advanced; a first duct in said body connecting said aperture to the atmosphere independently of the position of said barrier means; a first blocking element in said first duct; biasing means normally urging said first blocking element to close said first duct; a second duct in said body connecting said aperture to the atmosphere; a second blocking element in said second duct; biasing means normally urging said second blocking element to close said second duct; means connected to said throttle for opening said second blocking element when said throttle is in idling position; plug means normally closing said second duct; an electric solenoid for moving said plug means to an open position relative to said duct, said solenoid means being connectable to the electric generator of said engine whereby said plug means may be moved to an open position when the rotational speed of said engine rises above a predetermined value greater than idling.

11. Mixture control apparatus for use with an internal combustion engine having its exhaust and intake manifolds connected by a passage, comprising: a valve in said passage; a casing formed with a chamber; a pressure-responsive wall in said chamber adapted to undergo movement in response to the imposition upon its opposite sides of a fluid pressure differential, said wall being formed with a perforation; means connecting said wall and said valve whereby movement of said wall will effect concurrent movement of said valve between an open and a closed position relative to said passage; spring means biasing said valve to a closed position; a control valve body formed with an aperture; conduit means interconnecting the opposite side of said wall and said aperture; a main bore formed in said body connecting said aperture to the atmosphere; a frusto-conical barrier element coaxially slidably disposed within said bore, the smaller end of said barrier element being positioned proximate to said aperture; means interconnecting said barrier element and the throttle linkage of said engine whereby said element will be moved away from said aperture as the throttle is advanced so as to thereby gradually increase the effective area of said bore; an idling duct in said body connecting said aperture to the atmosphere independently of the position of said barrier element; a ball check in said idling duct; a spring normally biasing said ball check to a closed position; a decelerating duct in said body connecting said aperture to the atmosphere, said duct including an auxiliary bore coaxial to said main bore; a second ball check disposed in said auxiliary bore; a spring normally biasing said second ball check to a closed position; a pin mounted on said barrier element arranged to project into said auxiliary bore when said throttle linkage is in idling position so as to maintain said second ball check in an open position; a second auxiliary bore formed in said body and intersecting said deceleration duct; a piston slidably mounted in said second auxiliary bore, said piston being formed with an annular groove; spring means normally biasing said piston toward one end of said bore in which position said piston will block said deceleration duct; and an electric solenoid operatively associated with said piston, said solenoid being connectable to the electric generator of said engine whereby it may be actuated when the rotational speed of said engine rises above a predetermined value greater than idling to move said piston away from said one end of said second auxiliary bore so as to align said annular groove with said deceleration duct.

12. Mixture control apparatus for use with an internal combustion engine having its exhaust and intake manifolds connected by a passage, comprising: a valve in said passage; a casing formed with a chamber; a diaphragm in said chamber; means connecting said diaphragm and said valve whereby movement of said diaphragm will effect concurrent movement of said valve between an open and a closed position relative to said passage; means for placing one side of said diaphragm in communication with the intake manifold pressure of said engine; means including an aperture for placing the opposite side of said diaphragm in communication with the atmosphere; and means for varying the size of said aperture in accordance with the throttle setting of said engine.

13. Mixture control apparatus for use with an internal combustion engine having its exhaust and intake manifolds connected by a passage, comprising: a valve in said passage; a cylinder; a piston slidably mounted in said cylinder for axial movement relative thereto; means connecting said piston and said valve whereby movement of said piston will effect concurrent movement of said valve between an open and a closed position relative to said passage; means for placing one side of said piston in communication with the intake manifold pressure of said engine; means including an aperture for placing the opposite side of said piston in communication with the atmosphere; and means for varying the size of said aperture in accordance with the throttle setting of said engine.

14. Mixture control apparatus for use with an internal combustion engine having its exhaust and intake manifolds connected by a passage, comprising: a valve in said passage; a casing formed with a chamber, a longitudinal bore and an annular water passage surrounding said bore; fittings on said container for connecting said water passage to a source of water; a pressure-responsive wall in said chamber adapted to undergo movement in response to the imposition upon its opposite sides of a fluid pressure differential; a rod slidably disposed in said bore for longitudinal movement therein, one end of said rod extending into said chamber; retainer means on said one end of said rod; means on the other end of said rod operatively connected to said valve; spring means interposed between said container and said retainer means for normally biasing said rod toward said wall; means for placing one side of said wall in communication with the intake manifold pressure of said engine; means including an aperture for placing the opposite side of said wall in communication with the atmosphere; and means for varying the size of said aperture in accordance with the throttle setting of said engine.

15. Mixture control apparatus for use with an internal combustion engine having its exhaust and intake manifolds connected by a passage, comprising: a valve in said passage; a casing formed with a chamber, a longitudinal bore and an annular water passage surrounding said bore; fittings on said container for connecting said water passage to a source of water; a diaphragm extending across said chamber, said diaphragm being formed with a perforation; a rod slidably disposed in said bore for longitudinal movement therein, one end of said rod extending into said chamber; retainer means on said one end of said rod; means on the other end of said rod operatively connected to said valve; spring means biasing said rod toward said diaphragm whereby said valve will normally be maintained in a closed position; means for placing one side of said diaphragm in communication with the intake manifold pressure of said engine; and means including an aperture for placing the opposite side of said diaphragm in communication with the atmosphere.

16. Mixture control apparatus for use with an internal combustion engine having its exhaust and intake manifolds connected by a passage, comprising: a valve in said passage; a casing formed with a chamber; a diaphragm extending across said chamber, said diaphragm being formed with a perforation; means connecting said diaphragm and said valve whereby movement of said diaphragm will effect concurrent movement of said valve between an open and a closed position relative to said passage; means normally biasing said valve to a closed position; means for placing one side of said diaphragm in communication with the intake manifold pressure of said engine; means including an aperture for placing the opposite side of said diaphragm in communication with the atmosphere; a barrier element disposed in said aperture, said element being gradually reduced in cross-sectional area along its length; and means interconnecting the throttle controls of said engine and said barrier element whereby said element may be moved longitudinally within said aperture so as to increase the effective area of said aperture as the throttle is advanced.

17. Mixture control apparatus for use with an internal combustion engine having its exhaust and intake manifolds connected by a passage, comprising: a valve in said passage; a casing formed with a chamber; a diaphragm extending across said chamber, said diaphragm being formed with a perforation; means connecting said diaphragm and said valve whereby movement of said diaphragm will effect concurrent movement of said valve between an open and a closed position relative to said passage; spring means normally biasing said valve to a closed position; means for placing one side of said diaphragm in communication with the intake manifold pressure of said engine; a sleeve; a conduit interconnecting the portion of said chamber enclosing the opposite side of said diaphragm and one end of said sleeve; a transverse partition having a coaxial aperture disposed in said sleeve; a closure for the end of said sleeve opposite its conduit-connected end, said closure being coaxially bored; an opening to the atmosphere formed in said sleeve between said partition and said closure; a tapered needle coaxially slidably supported in said sleeve by means of the bore formed in said closure, the small end of said needle normally being disposed between said partition and the conduit-connected end of said sleeve; and means connecting said needle to the throttle linkage of said engine whereby as the throttle is opened the small end of said needle will be moved toward said closure.

18. Mixture control apparatus for use with an internal combustion engine, comprising: a venturi tube disposable in communication with the exhaust outlet of said engine; passage means in communication with said venturi tube and connecting said exhaust outlet with the intake manifold of said engine; a valve in said passage means for controlling the quantity of exhaust gas flowing therethrough; and means for actuating said valve.

19. Mixture control apparatus for use with an internal combustion engine, comprising: a venturi tube disposable adjacent the exhaust outlet of said engine, said venturi tube being formed with a port at its neck portion; conduit means interconnecting said port and the crank case of said engine; pipe means interposed between said exhaust outlet and said venturi tube; a support block formed with a valve bore connected to said pipe means; adaptor means in communication with said valve bore and interposable between the carburetor and intake manifold of said engine; a valve mounted in said valve bore for controlling the flow of exhaust gas from said engine through said valve bore; and means for actuating said valve.

20. Mixture control apparatus for use with an internal combustion engine, comprising: a venturi tube disposable in communication with the exhaust outlet of said engine; passage means in communication with said venturi tube and connecting said exhaust outlet with the intake manifold of said engine; a valve in said passage means for controlling the quantity of exhaust gas flowing therethrough; a casing adapted to be mounted adjacent said engine, said casing being formed with a chamber; a pressure-responsive wall in said chamber adapted to undergo movement in response to the imposition upon its opposite sides of a fluid pressure differential, said wall being formed with a perforation; means connecting said wall and said valve whereby movement of said wall will effect concurrent movement of said valve between an open and a closed position relative to said passage; means for placing one side of said wall in communication with the intake manifold pressure of said engine; means including an aperture for placing the opposite side of said wall in communication with the atmosphere; and means for varying the size of said aperture in accordance with the throttle setting of said engine.

21. Mixture control apparatus for use with an internal combustion engine, comprising: a venturi tube disposable in communication with the exhaust outlet of said engine; passage means in communication with said venturi tube and connecting said exhaust outlet with the intake manifold of said engine; a valve in said passage means for controlling the quantity of exhaust gas flowing therethrough; a casing adapted to be mounted adjacent said engine, said casing being formed with a chamber; a diaphragm extending across said chamber, said diaphragm being formed with a perforation; spring means biasing said valve to a closed position; means connecting said diaphragm and said valve whereby movement of said diaphragm will effect concurrent movement of said valve between an open and a closed position relative to said passage; means for placing one side of said diaphragm in communication with the intake manifold pressure of said engine; means including an aperture for placing the opposite side of said diaphragm in communication with the atmosphere; a barrier element disposed in said aperture, said element being gradually reduced in cross-sectional area along its length; and means interconnecting the throttle controls of said engine and said barrier element whereby said element may be moved longitudinally within said aperture so as to increase the effective area of said aperture as the throttle is advanced.

22. Mixture control apparatus for use with an internal combustion engine, comprising: a venturi tube disposable in communication with the exhaust outlet of said engine; pipe means mounted adjacent said venturi tube and in communication therewith; a support block formed with a valve bore connected to said pipe; adaptor means in communication with said valve bore and interposable between the carburetor and intake manifold of said engine; a valve mounted in said valve bore for controlling the flow of exhaust gas from said engine through said valve bore; a casing mounted by said support block, said casing being formed with a chamber and a rod passage in communication with said valve bore; a pressure-responsive wall extending across said chamber; a rod slidably mounted in said rod passage, one end of said rod being connected to said valve; a retainer secured upon the opposite end of said rod; a spring interposed between said retainer and said casing for biasing said rod toward said wall whereby said valve will normally be biased to a closed position; means including an aperture for placing the side of said wall opposite said rod in communication with the atmosphere; and means for varying the size of said aperture in accordance with the throttle setting of said engine.

23. Mixture control apparatus for use with an internal combustion engine, comprising: a venturi tube disposable in communication with the exhaust outlet of said engine; pipe means mounted adjacent said venturi tube and in communication therewith; a support block formed with a valve bore connected to said pipe; adaptor means in communication with said valve bore and interposable between the carburetor and intake manifold of said engine; a valve mounted in said valve bore for controlling the flow of exhaust gas from said engine through said valve bore; a casing mounted by said support block, said casing being formed with a chamber and a rod passage in communication with said valve bore; a rod slidably mounted in said rod passage, one end of said rod being connected to said valve; a retainer secured upon the opposite end of said rod; a helical spring carried by said rod interposed between said retainer and said casing for biasing said rod toward said diaphragm whereby said valve will normally be biased to a closed position; means including an aperture for placing the portion of said chamber on the side of said diaphragm opposite said rod in communication with the atmosphere; and means for varying the size of said aperture in accordance with the throttle setting of said engine whereby said aperture will be closed when said engine is operating at near-full and full throttle conditions, and said aperture will be opened when said engine is operating at less than near-full throttle conditions.

24. Mixture control apparatus for use with an internal combustion engine, comprising: a venturi tube disposable in communication with the exhaust outlet of said engine; pipe means mounted adjacent said venturi tube and in communication therewith; a support block formed with a valve bore connected to said pipe; adaptor means in communication with said valve bore and interposable between the carburetor and intake manifold of said engine; a valve mounted in said valve bore for controlling the flow of exhaust gas from said engine through said valve bore; a casing mounted by said support block, said casing being formed with a chamber and a rod passage in communication with said valve bore; a diaphragm extending across said chamber, said diaphragm being formed with a perforation; a rod slidably mounted in said rod passage, one end of said rod being connected to said valve; a retainer secured upon the opposite end of said rod; a helical spring carried by said rod interposed between said retainer and said casing for biasing said rod toward said diaphragm whereby said valve will normally be biased to a closed position; means including an aperture for placing the portion of said chamber on the side of said diaphragm opposite said rod in communication with the atmosphere; and means for varying the size of said aperture in accordance with the throttle setting of said engine whereby said aperture will be closed when said engine is operating at near-full and full throttle conditions, and said aperture will be opened when said engine is operating at less than near-full throttle conditions.

25. Mixture control apparatus for use with an internal combustion engine having its exhaust and intake manifolds connected by a passage, comprising: a valve in said passage; and means responsive to the differential between said engine's intake manifold pressure and the atmospheric pressure for maintaining said valve in closed position when said engine is operating at full throttle and near-full throttle conditions, and in open position when said engine is operating at less than near-full throttle conditions.

26. Mixture control apparatus for use with an internal combustion engine having its exhaust and intake manifolds connected by a passage, comprising: a valve in said passage; a casing formed with a chamber; a pressure-responsive wall in said chamber adapted to undergo movement in response to the imposition upon its opposite sides of a fluid pressure differential; means connecting said wall and said valve whereby movement of said wall will effect concurrent movement of said valve between an open and a closed position relative to said passage; means for placing one side of said wall in communication with the intake manifold pressure of said engine; means including an aperture for placing the opposite side of said wall in communication with the atmosphere; means by-passing said wall for connecting the atmosphere with said one side of said wall; and means for varying the size of said aperture in accordance with the throttle setting of said engine.

27. Mixture control apparatus for use with an internal combustion engine having its exhaust and intake manifolds connected by a passage, comprising: a valve in said passage; a casing formed with a chamber; a diaphragm in said chamber; means connecting said diaphragm and said valve whereby movement of said diaphragm will effect concurrent movement of said valve between an open and a closed position relative to said passage; means for placing one side of said diaphragm in communication with the intake manifold pressure of said engine; means including an aperture for placing the opposite side of said diaphragm in communication with the atmosphere; means by-passing said diaphragm for connecting the atmosphere with said one side of said diaphragm; and means for varying the size of said aperture in accordance with the throttle setting of said engine.

28. Mixture control apparatus for use with an internal combustion engine having its exhaust and intake manifolds connected by a passage, comprising: a valve in said passage; a cylinder; a piston slidably mounted in said cylinder for axial movement relative thereto; means connecting said piston and said valve whereby movement of said piston will effect concurrent movement of said valve between an open and a closed position relative to said passage; means for placing one side of said piston in communication with the intake manifold pressure of said engine; means including an aperture for placing the opposite side of said piston in communication with the atmosphere; means by-passing said piston for connecting the atmosphere with said one side of said piston; and means for varying the size of said aperture in accordance with the throttle setting of said engine.

29. Mixture control apparatus for use with an internal combustion engine, comprising: a venturi tube disposable in communication with the exhaust outlet of said engine; passage means in communication with said venturi tube and connecting said exhaust outlet with the intake manifold of said engine; a valve in said passage means for controlling the quantity of exhaust gas flowing therethrough; and means for actuating said valve, said means maintaining said valve in closed position when said engine is operating at full throttle and near-full throttle conditions, and in open position when said engine is operating at less than near-full throttle conditions.

30. Mixture control apparatus for use with an internal combustion engine, comprising: a venturi tube disposable adjacent the exhaust outlet of said engine; pipe means interposed between said exhaust outlet and said venturi tube; a support block formed with a valve bore connected to said pipe means; adaptor means in communication with said valve bore and interposable between the carburetor and intake manifold of said engine; a valve mounted in said valve bore for controlling the flow of exhaust gas from said engine through said valve bore; and means for actuating said valve.

31. Mixture control apparatus for use with an internal combustion engine having its exhaust and intake manifolds connected by a passage, comprising: a valve for controlling the flow of fluid through said passage; and means for varying the position of said valve in accordance with the flow of fuel to said engine, said means maintaining said valve in closed position when said engine is operating at full throttle and near-full throttle conditions, and in open position when said engine is operating at less than near-full throttle conditions.

32. Mixture control apparatus for use with an internal combustion engine having its exhaust and intake manifolds connected by a passage, comprising: a valve for controlling the flow of fluid through said passage; and means for varying the position of said valve in accordance with the flow of fuel to said engine, said means maintaining said valve in partially open position when said engine is operating at less than near full throttle conditions including idling conditions; and, means for maintaining said valve in a more fully open position during decelerating conditions than during idling conditions.

33. Mixture control apparatus for use with an internal combustion engine having its exhaust and intake manifolds connected by a passage, comprising: a valve in said passage; a casing; a pressure-responsive wall carried by said casing adapted to undergo movement in response to the imposition on its opposite sides of a fluid pressure differential, one side of said wall being exposed to the atmosphere and the opposite side thereof being exposed to the intake manifold pressure; and, means connecting said wall and said valve whereby movement of said wall will effect concurrent movement of said valve between an open and a closed position relative to said passage and exhaust gas will be admitted to said intake manifold during less than near-full throttle conditions.

34. Mixture control apparatus for use with an internal combustion engine having an intake manifold that is connected to a source of fluid by means of a passage, comprising: a valve in said passage; a casing; a pressure-responsive wall carried by said casing adapted to undergo movement in response to the imposition on its opposite sides of a fluid pressure differential, one side of said wall being exposed to the atmosphere and the opposite side thereof being exposed to the intake manifold pressure; and, means connecting said wall and said valve whereby movement of said wall will effect concurrent movement of said valve between an open and a closed position relative to said passage and said fluid will be admitted to said intake manifold during less than full-throttle conditions.

References Cited in the file of this patent

UNITED STATES PATENTS

| | | |
|---|---|---|
| 1,895,789 | Doering | Jan. 31, 1933 |
| 2,033,019 | Weinmann et al. | Mar. 3, 1936 |
| 2,035,775 | Vander Veer | Mar. 31, 1936 |
| 2,354,179 | Blanc | July 25, 1944 |